(12) United States Patent
Gradle (10) Patent No.: US 8,148,840 B2
(45) Date of Patent: Apr. 3, 2012

(54) OCEAN WIND WATER PUMP FOR DE-ENERGIZING A STORM

(75) Inventor: Randall Gradle, Dallas, TX (US)

(73) Assignee: Randall Gradle, Dallas, TX (US)

( * ) Notice: Subject to any disclaimer, the term of this patent is extended or adjusted under 35 U.S.C. 154(b) by 452 days.

(21) Appl. No.: 12/339,296

(22) Filed: Dec. 19, 2008

(65) Prior Publication Data
US 2010/0155499 A1    Jun. 24, 2010

(51) Int. Cl.
*F03D 9/00* (2006.01)

(52) U.S. Cl. ............. 290/53; 60/645; 239/14.1; 290/55; 415/7; 415/121.3; 416/146 R; 417/331; 417/334; 417/337; 114/125; 114/311

(58) Field of Classification Search ............. 210/170.05, 210/170.11, 242.1; 239/2.1, 14.1; 114/125, 114/311; 60/645; 290/52–55, 44; 417/53, 417/334, 335, 330, 331, 337; 415/7, 121.3; 416/146 R
See application file for complete search history.

(56) References Cited

U.S. PATENT DOCUMENTS

| | | | | |
|---|---|---|---|---|
| 4,245,475 A | * | 1/1981 | Girden | 60/641.7 |
| 4,322,897 A | * | 4/1982 | Brassfield | 37/322 |
| 7,291,936 B1 | * | 11/2007 | Robson | 290/43 |
| 7,520,237 B1 | * | 4/2009 | Dimov Zhekov | 114/264 |
| 7,536,967 B2 | * | 5/2009 | Barber | 114/144 R |
| 2002/0009338 A1 | * | 1/2002 | Blum et al. | 405/303 |
| 2007/0101921 A1 | * | 5/2007 | Goldschmidt | 114/382 |
| 2007/0270057 A1 | * | 11/2007 | Feldman et al. | 441/1 |
| 2008/0277492 A1 | * | 11/2008 | Cannon | 239/14.1 |
| 2009/0016887 A1 | * | 1/2009 | Vettese et al. | 416/198 R |
| 2009/0173801 A1 | * | 7/2009 | Bowers et al. | 239/14.1 |
| 2010/0224694 A1 | * | 9/2010 | Wright et al. | 239/2.1 |

FOREIGN PATENT DOCUMENTS

DE              3425852       *    1/1986

OTHER PUBLICATIONS

Derwent Abstract for DE 3425852 (published 1986), downloaded from EAST on Jun. 20, 2011.*

* cited by examiner

Primary Examiner — Joseph Drodge
(74) Attorney, Agent, or Firm — Howison & Arnott, L.L.P.

(57) ABSTRACT

An engine for reducing the temperature at the surface of a body of water during a storm includes at least one floatation member for supporting the engine, an elongate tube mounted on the floatation member configured to receive a stream of air therethrough, the elongate tube having first and second ends, a constricted center section therebetween and means for distributing water into the tube adjacent the constricted center section, a wind turbine having at least one rotor, a differential and a shaft connecting the rotor to the differential, a pump operatively connected to the wind turbine and extending into the body of water to a depth where the temperature of the water is less the water temperature at the surface and wherein water from beneath the surface of the body of water is pumped into the manifold and distributed into the elongate tube to cool the stream of air.

21 Claims, 4 Drawing Sheets

OCEAN WIND WATER PUMP FOR DE-ENERGIZING A STORM

TECHNICAL FIELD

The disclosure relates to an ocean wind water pump or engine for de-energizing a storm.

BACKGROUND

Hurricanes can be incredibly destructive. For example, hurricane Katrina, one of the costliest and deadliest hurricanes in the history of the United States, devastated much of the north-central Gulf Coast. Katrina is believed to have caused over 1800 deaths during the storm and subsequent flooding. Damage from the storm was estimated to be over $80 billion.

A hurricane is a storm system characterized by a low pressure center, high winds in a circular pattern and numerous thunderstorms. Hurricanes are categorized based on the wind velocity of the storm. A category one hurricane has wind velocities between about 74 and 95 miles per hour while a category five hurricane, the most severe, has wind velocities in excess of 155 miles per hour. A hurricane can be conceptualized as a vertical heat engine having a primary energy source consisting of the release of the heat of condensation from water vapor condensing at high altitudes, with solar heating being the initial source for evaporation. The condensation leads to higher wind speeds, with faster winds and lower pressure causing increased surface evaporation and more condensation at higher altitudes.

The energy released during condensation at the higher altitudes drives updrafts, increasing the height of the storm clouds and increasing the rate of condensation. This positive feedback loop continues for as long as conditions are favorable. It is believed that in most instances, high humidity and water surface temperatures of at least about 80° F. are required to form and sustain a hurricane. These conditions cause the overlying atmosphere to be unstable enough to sustain convection and thunderstorms.

Hurricanes dissipate naturally when the storm moves over water having a temperature less than about 80° F. or when the hurricane moves over land. In either case, the hurricane is deprived of the humidity and warmth required to sustain the positive feedback loop that drives the storm. In the past, there have been attempts made to artificially dissipate or weaken hurricanes. For example, attempts have been made to weaken hurricanes by seeding with silver iodide. Such attempts have been generally unsuccessful and there exists a need for an artificial means of alleviating the damage caused by hurricanes by dissipating or weakening the storms.

In most large bodies of water where hurricanes occur, the temperature of the water decreases with increasing depth since most of the solar radiation (light and heat) that hits the surface is absorbed in the first few meters of water. In some locations, currents conduct cold water from the Polar Regions to warmer areas, one example being the deep western boundary current. Consequently, while the surface temperature of ocean water may be great enough to sustain a hurricane, the temperature of the water beneath the surface is typically substantially lower. Thus, there exists a need for means to exploit this temperature differential to de-energize storms such as hurricanes.

SUMMARY

An engine for reducing the temperature at the surface of a body of water during a storm includes at least one floatation member for supporting the engine when deployed in the body of water and an elongate tube mounted on the floatation member. The elongate tube mounted on the floatation device is configured to receive a stream of air therethrough and includes first and second tapered end portions. A constriction or constricted portion of the tube is located between the first and second end and a manifold and/or plurality of pipes are provided for distributing water into the tube adjacent the constricted center section. In one variation, the elongate tube is rotatably mounted on the floatation member such that the tube may be rotated relative to the floatation member.

The engine includes a wind turbine having at least one rotor, a differential and a shaft connecting the rotor to the differential. The shaft may be a coaxial speed reduction shaft. A pump is operatively connected to the wind turbine and extends into the body of water to a depth where the temperature of the water is at least 20° C. below the surface temperature of the water. The pump pumps water from the body of water into the manifold or plurality of pipes to distribute the water into the elongate tube and the air stream passing through the tube. Water having a temperature less than the temperature of the water at the surface of the body of water is pumped into the manifold and distributed into the elongate tube to cool the stream of air passing through the tube.

In one variation, the wind turbine may be a dual rotor horizontal coaxial contra-rotating machine mounted on the top or inside the elongate tube. In other embodiments the wind turbine may be single rotor horizontal coaxial machine having a rotor upstream or downstream of the differential. The single rotor horizontal coaxial machine may be mounted inside the elongate tube, on top of the tube or alongside of the tube.

In one aspect, the engine includes a pump having first and second coaxial counter-rotating shafts, wherein the second shaft is positioned inside the first shaft and wherein the counter-rotating shafts are driven by the wind turbine differential and extend into the body of water. In one variation, the first shaft may be substantially longer than the second shaft and may be from fifty to about five thousand feet in length when deployed in a body of water. The pump may include first and second counter-rotating impellers wherein the first impeller is mounted on an inside surface of the first coaxial counter-rotating shaft and wherein the second impeller is mounted on an outside surface of the second counter rotating shaft within the first counter-rotating shaft. The impellers pump water through an annular space between the counter-rotating shafts and into a manifold or plurality of pipes for distribution into the air stream passing through the elongate tube.

In one embodiment, the floatation device may be a pair of pontoons adapted to be flooded to stabilize the engine on a body of water. A sea anchor may also be provided for stabilizing the engine. A floodable ballast tank may be mounted on the second coaxial counter-rotating shaft adjacent the lower end of the shaft to stabilize the first and second coaxial shafts. A generator driven by the wind turbine may be used to generate electrical power to operate lights, an air compressor and other electrical devices.

In one aspect, a method of de-energizing a storm such as a hurricane includes the step of deploying a plurality of the engines described above in anticipated path of the storm. The engines may be tethered together along a line in the path of the storm. In one variation the engines are tethered together along a line substantially parallel to an anticipated radius between the eye of the storm and an outer edge thereof. The engines are provided with sea anchors, such that the engines maintain position within the storm while still traveling with the storm.

The engines pump relatively cold water, (e.g. having a temperature at least 20° C. less the surface temperature) to de-energize the storm by depriving it of its energy source.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of an ocean water pump for de-energizing a storm are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
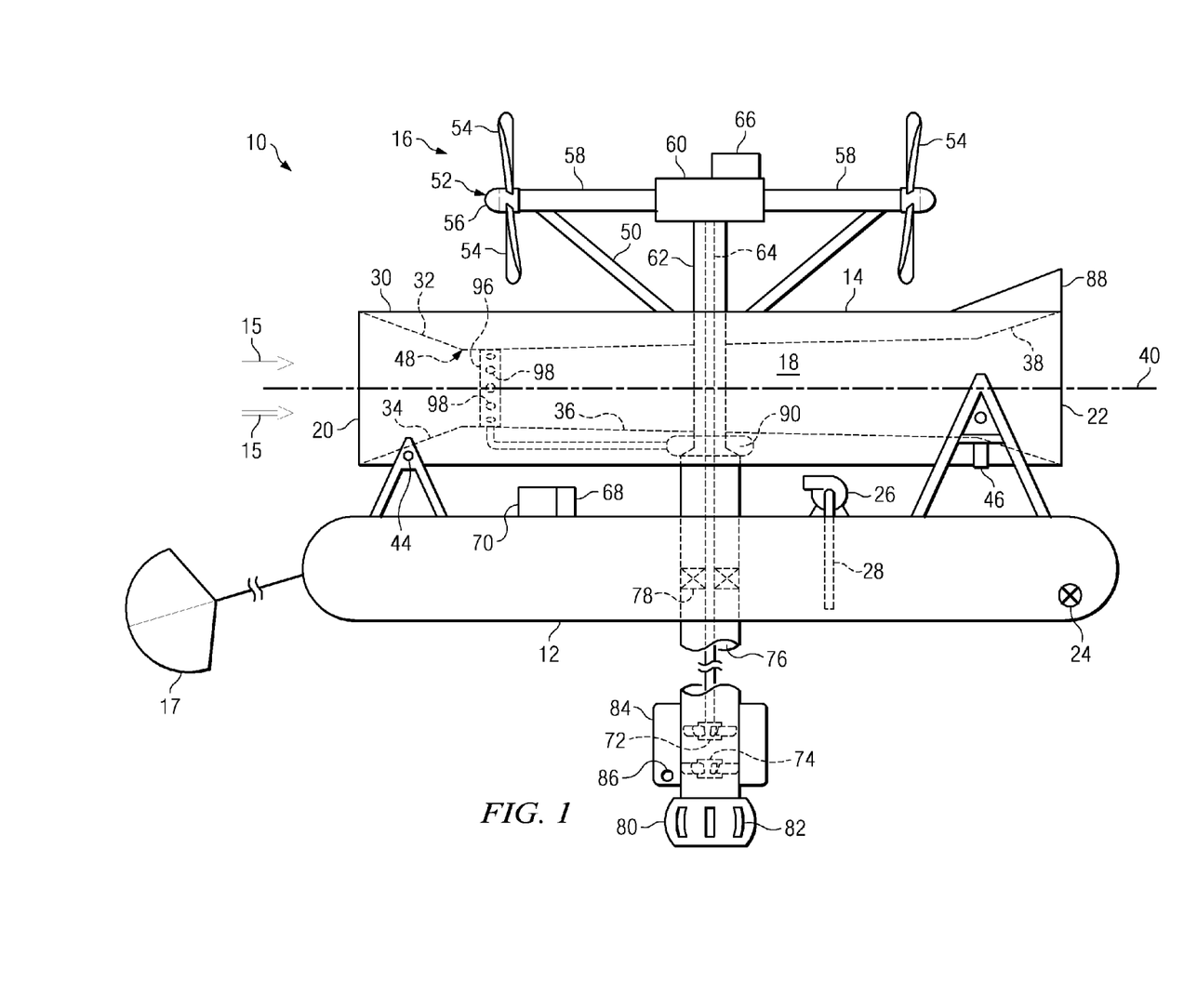
FIG. 1 is a side view of an ocean wind water pump according to the disclosure.
Figure 2:
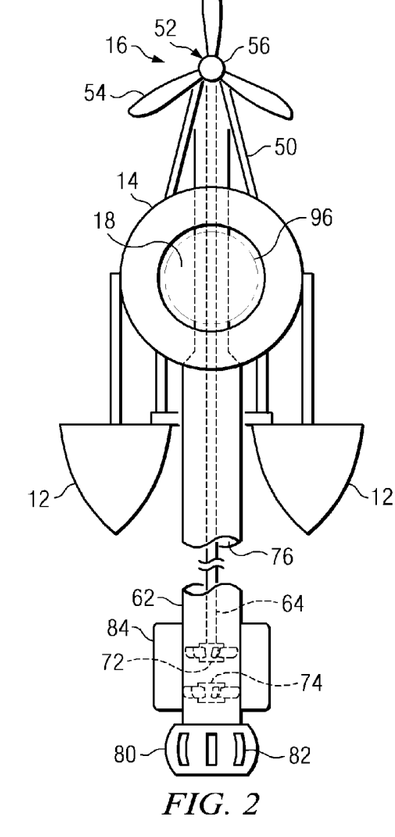
FIG. 2 is a end view of the ocean wind water pump of FIG. 1.

FIGS. 1 and 2 are side and end views of one embodiment of an ocean wind water engine for de-energizing a storm. As illustrated, engine 10 includes a pair of floatation members such as pontoons 12, an elongated cylindrical tube 14 having a central passage 18 and a wind turbine 16. Elongated cylindrical tube 14 is configured to direct an air stream indicated by arrows 15 though central passage 18 during a storm. As illustrated, a pair of pontoons 12 having a generally "V" shaped cross-section are used for supporting engine 10 on a body of water; however, a single floatation member or multiple floatation members having different geometries may be utilized to support the engine. In one variation, pontoons 12 are equipped with valves 24 to flood the pontoons with water (ballast) to stabilize engine 10 when deployed. One or more pumps 26 having inlet pipes 28 extending into pontoons 12 may be utilized to pump water out of the pontoons when desired. Alternatively, a source of compressed air may be used to blow water from pontoons 12.

In one embodiment, cylindrical tube 14 has a length of approximately one hundred feet with an outside diameter of approximately sixty feet. Cylindrical tube 14 includes an outer wall 30 and an inner wall 32 that are joined at the inlet 20 and outlet 22 of tube 14. As illustrated, inner wall 32 defines a central passage 18 that includes a first, inwardly tapering section 34, and second and third outwardly tapering section 36 and 38, respectively. In inner tapering section 34 inner wall 32 may be inclined inwardly toward a central longitudinal axis 40 of the tube at an angle of approximately thirty degrees over a length of ten to twenty feet to form an internal constriction 48. In one variation, the inside diameter of constriction 48 is approximately forty feet. In other variations, the inside diameter of constriction 48 may be from twenty to fifty feet. In second section 36 inner wall 32 is outwardly tapered at an angle of approximately five degrees over a length of seventy to eighty feet. In third section 38 inner wall 32 tapers outwardly over the remainder of the length of cylindrical tube 14. As set forth in greater detail below, inner wall 32 is configured to act as a venturi, to assist in distributing water into air flowing though tube 14.

As illustrated, tube 14 is cylindrical; however, other geometries may be used. For example, outer wall 30 may have a rectangular cross-section with inner wall 32 having a circular cross-section. Alternatively, inner and outer walls 30, 32 may both have the same or different oval or polygonal cross-sections.

Cylindrical tube 14 may be mounted on pontoons 12 with a support structure including a hinged connection 44 near inlet 20 and a cradle support 46 near outlet 22 that extends around the circumference of a lower portion of tube 14. Hinged connection 44 and cradle support 46 permit tube 14 to be rotated relative to pontoons 12 for ease of transportation. In one embodiment, pontoons 12 have a depth and width of approximately fifty feet and may be slightly longer than tube 14 to accommodate support structure 42. Pontoons 12 may be provided with internal and external bracing and additional structural members to support the weight of cylindrical tube 14 and wind turbine 16. Cylindrical tube 14 and pontoons 16 may be formed from glass reinforced plastics, carbon composite materials or a suitable metal alloy. Cylindrical tube 14 may also be provided with internal and external bracing and additional structural members to support the weight of wind turbine 16.

In one variation, wind turbine 16 is mounted on the top of tube 14 by means of support beams 50. Wind turbine 16 may be a horizontal coaxial contra-rotating machine having rotors 52. Each of rotors 52 includes blades 54 attached to a hub 56 mounted on a shaft 58. In one embodiment, blades 54 are approximately 16 feet long, resulting in a swept area approximately thirty two feet in diameter. In other variations, blades 54 may be from about 10 feet long to about 20 feet long. Blades 54 may be formed from glass reinforced plastics, carbon composite, a suitable metal alloy or a combination thereof. In the illustrated embodiment, three blades 54 are mounted on each of hubs 56 at spaced apart circumferential intervals of approximately one hundred and twenty degrees. Alternatively, rotors 52 may include two or more than three blades 54, depending upon the particular design. Rotors 52 may be configured with variable pitch blades so as to vary the angle of attack of the blades, depending upon the conditions. In severe storms, the angle of attack of blades 54 may be adjusted to reduce the speed of rotor 52 and/or to prevent excessive bending of the blades. In alternate embodiments, more than two rotors 52 may be used or a vertical axis wind turbine may be used in place of the illustrated horizontal axis coaxial contra-rotating machine.

Shafts 58 of wind turbine 16 transmit rotational force from rotors to a gearbox or differential 60 which drives inner and outer coaxial counter-rotating shafts 62 and 64. As illustrated, shaft 64 is positioned inside hollow shaft 62 and is driven in the opposite rotary direction from shaft 62. In one variation, gearbox 60 also drives a generator 66 to produce electricity to power on board devices such. A rectifier 68 and one or more electrical storage devices 70 such as batteries or capacitors may be connected to generator 66 to rectify and store electrical energy produced by the generator.

When engine 10 is deployed on a body of water such as an ocean or gulf, coaxial shafts 62 and 64 extend downwardly from gearbox 60 through tube 14 into the water. Coaxial shafts 62 and 64 may be formed with telescoping sections to aid in extending the shafts into the water. Alternatively, shafts 62 and 64 may be stored in sections on pontoons 12 and connected to differential or gearbox 60 when engine 10 is deployed. Shafts 62 and 64 may be constructed from glass reinforced plastics, carbon composite, a suitable metal alloy or a combination thereof. Shafts 62 may include one or more flexible joints to prevent damage to the shafts when pontoons 12 move in response to wave motion.

Referring still to FIGS. 1 and 2, in one embodiment, a pump is utilized to pump water up thought the annular space 76 between outer and inner coaxial shafts 62 and 64. In the illustrated embodiment, the pump includes a first impeller 72 mounted on the outside of inner coaxial shaft 64 and a second impeller 74 is mounted on the inside of outer coaxial shaft 62. Impellers 72 and 74 pump water up through the annular space 76 between the first and second shafts. Impellers 72 and 74 may be spaced apart a sufficient distance to minimize the effect of turbulence generated by the counter rotating impeller blades. Depending upon the depth to which shafts 62 and 64 are extended into the water, a plurality of first and second impellers 72 and 74 may be provided. A plurality of bearings or bushings 78 may be provided between outer shaft 62 and inner shaft 64 at spaced apart intervals to maintain the spacing between the shafts. In one variation, bushing 78 is mounted on inner shaft 64 and supported by one or more brackets attached to the inside of outer shaft 64 such that the inner shaft rotates within the bushing. Preferably the brackets are configured to obstruct as little as possible of annular space 76.

In some instances, inner shaft 64 may be substantially shorter than outer shaft 62. Inner shaft 64 should extend far enough into outer shaft longitudinally into outer shaft 62 to permit efficient pumping using the available energy from wind turbine 16. However, outer shaft 62 should extend to a depth where the water temperature is significantly lower than the surface temperature. Preferably, outer shaft 62 is deployed to a depth where the water temperature is at least 20° C. cooler than the surface temperature. Thus, for example, in some instances inner shaft 64 may extend to a depth of twenty to five hundred feet or more into the water while outer shaft 62 may extend to a depth from fifty to several thousand feet. For example, in some ocean locations, outer shaft 62 may be configured to extend into the thermocline which may begin at a depth from 100 to 400 meters and greater.

In one embodiment, an intake screen 80 is mounted on the lower end of coaxial shaft 64. Intake screen 80 may include a plurality of openings or slots 82 sized to prevent ingress of most fish and other aquatic life. Screen 80 also prevents ingress of debris. Alternatively, intake screen 80 may be constructed from a wire mesh having a sufficiently small mesh to prevent ingress of fish, other aquatic life and debris.

One or more ballast tanks 84 may be utilized to stabilize the outer 62 and inner 64 coaxial shafts when engine 10 is deployed. In the illustrated embodiment, a cylindrical ballast tank 84 is mounted around outer coaxial shaft 62 near or adjacent to the end of the shaft. As outer coaxial shaft 62 is lowered into the water, tank may be filled with water (ballast) through a valve or opening 86 in the bottom or side of the tank. When outer coaxial shaft is lifted for recovery, the water in the ballast tank may be blown out with a source of compressed air connected to the top of the tank. The source of compressed air may be bottled compressed air or an air compressor mounted on engine 10.

In operation, engine 10 is deployed at the desired location with inlet 20 of cylindrical tube 14 facing into the wind. Pontoons 12 may be flooded or partially flooded to stabilize engine 10. In order to maintain engine 10 in this position in high winds and waves, engine 10 may be provided with one or more sea anchors 17 (FIG. 1). Sea anchor 17 may have a parachute-like configuration and be formed form a suitable fabric such as nylon. Sea anchor 17 serves to maintain the orientation of engine 10 with inlet 20 facing into the wind while allowing the engine to move with a storm. Engine 10 may also include one or more longitudinally extending vanes 88 mounted on cylindrical tube 14 or pontoons 12 to maintain its orientation.

Figure 3:
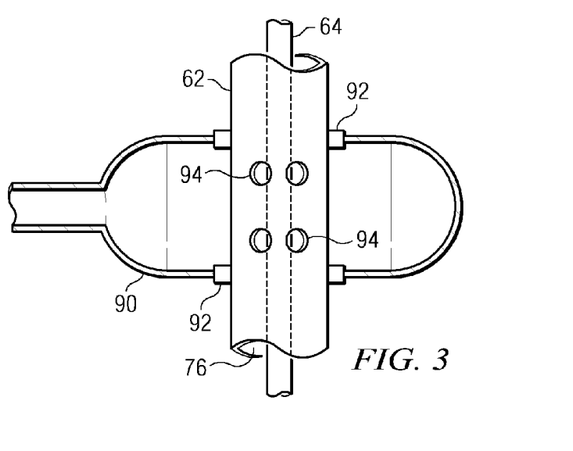
FIG. 3 is a partial cut-away view of a take off fitting for use with the ocean wind water pump of FIG. 1.

Wind turbine 16 drives coaxial shafts 62, 64 and impellers 72, 74 to pump water up though annular space 76 and into a take off fitting 90 mounted between outer wall 30 and inner wall 32. As best illustrated in FIG. 3, in one embodiment, outer coaxial shaft 62 passes through take off fitting 90. As illustrated, takeoff fitting 90 may be provided with seals 92 that allow outer coaxial shaft 62 to rotate within the fitting. A plurality of holes 94 formed in the portion of outer coaxial shaft 62 inside take off fitting 90 allows water from annular space 76 to flow into the fitting. Referring again to FIG. 1, water from take off fitting 90 is directed though a pipe to a distributor or manifold 96.

In the illustrated embodiment, a generally cylindrical manifold 96 extends circumferentially around inner wall 32 at or slightly downstream of constriction 48. Water from manifold 96 flows through a plurality of holes or ports 98 formed though inner wall 32 and into central passage 18, cooling the air passing through tube 14. Placing manifold 96 at or slightly downstream of constriction 48 aids in pumping and distributing the water into central passage 18 because the pressure inside passage 18 at the constriction will be reduced due to the venturi effect of the constriction. Although as illustrated manifold 96 extends completely around the circumference of inner wall 32 at constriction 48, in other variations the manifold may extend only partially around the circumference of the inner wall or may be mounted inside the inner wall. In yet other embodiments, a plurality of individual pipes may be substituted for manifold 96.

The engine of FIG. 1 is designed to operate in storms having wind velocities of from about 74 to about 190 miles per hour. The wind turbine is expected to generate between about 17,000 and 44,700 hp to lift between about 20,000 and 60,000 lbs of water per minute. It is estimated that atomizing the water will produce a droplet surface area of between 815,600,000 and 2,095,000,000 square inches per hour.

It is contemplated that a plurality (up to about 5000 or more) of devices such as engine 10 of FIG. 1 would be deployed in the path of an oncoming hurricane. The devices would be tethered together in a line along an anticipated radius of the storm and provided with sea anchors to maintain position within the storm while still traveling with the storm. The devices would pump relatively cold water, (e.g. having a temperature at least 20° C. less the surface temperature) to de-energize the storm by depriving it of its warm water energy source.

Figures 4, 5:
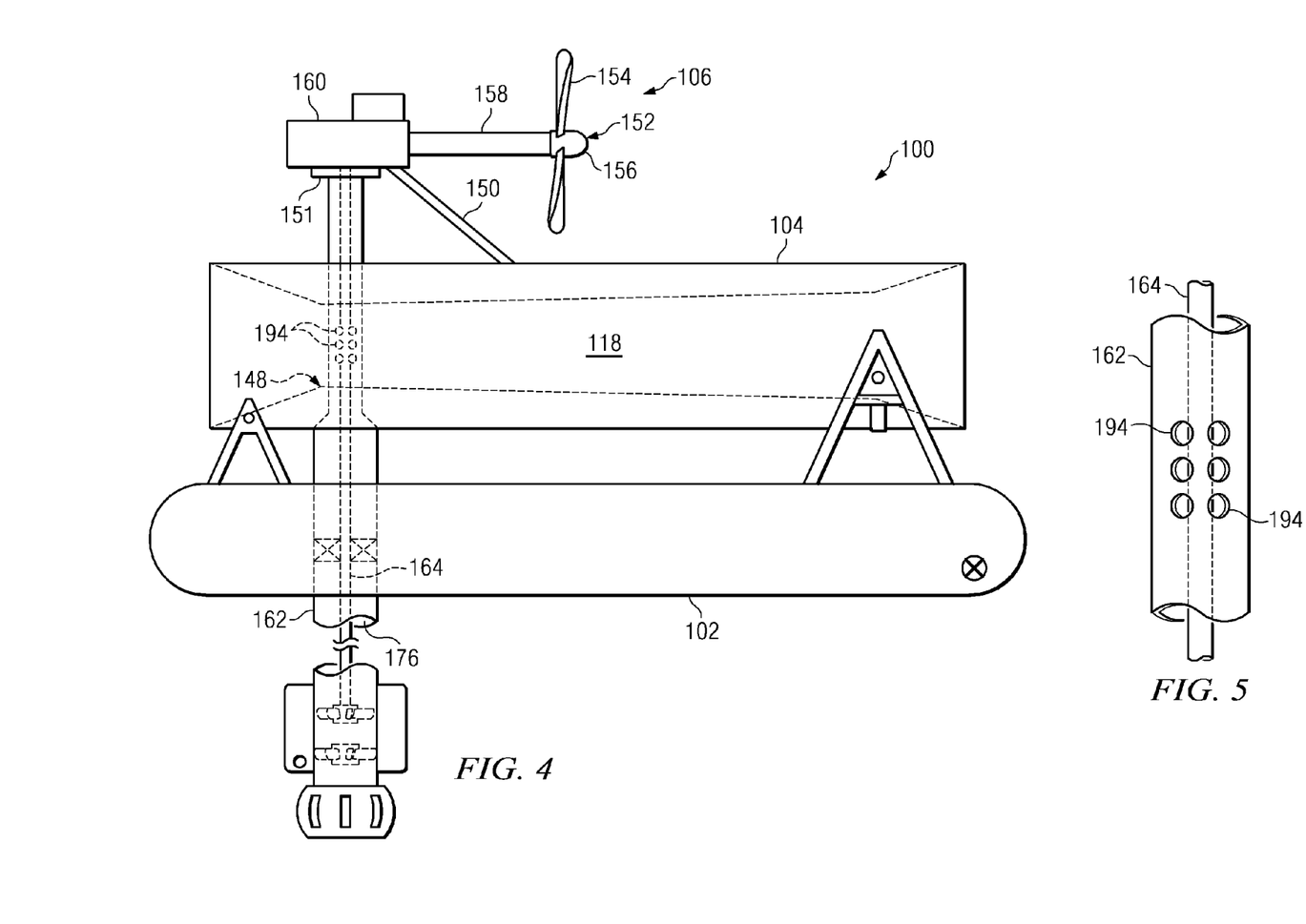
FIG. 4 is a side view of a second embodiment of a wind water pump according to the disclosure.
FIG. 5 is a partial cut-away view of an apparatus for distributing water within the wind water pump of FIG. 5.

FIG. 4 is a side view of an alternate embodiment of an ocean wind water engine for de-energizing a storm. As illustrated, engine 100 includes a pair of floatation members such as pontoons 102, an elongated cylindrical tube 104 and a wind turbine 106. Pontoons 102 and elongated tube 104 are substantially the same as pontoons 12 and tube 14 described above.

Wind turbine 106 may be a horizontal axis machine having a single, rotor 152 connected to differential 160 with a drive shaft 158. In one embodiment rotor 152 includes three blades 154 connected to a hub 156. In other embodiments, rotor 152 may have a greater or lesser number of blades. As illustrated, rotor 152 is positioned on the downwind side of differential 160. Differential 160 is rotatably mounted on cylindrical tube 104 by means of support structure 150 and a collar or swivel 151. Unlike wind turbine 16 of FIG. 1, which is rigidly mounted in parallel with cylindrical tube 14, turbine 106, may swivel such that the turbine is directed into the wind even if tube 104 not directly aligned with the wind or if the wind direction is changing. In other variations, rotor 152 may be mounted on the upwind side of differential 160 with a drive for aligning the rotor into the wind.

Wind turbine 106 drives counter-rotating shafts 162, 164 to pump water in generally the same manner as described above in connection with wind turbine 16 and shafts 62 and 64. However, in the embodiment illustrated in FIG. 4, shafts 162, 164 pass through tube 104 at constriction 148 or slightly to the downwind side of the constriction. As best illustrated in FIG. 5, a plurality of ports or holes 194 are formed in a portion of outer coaxial shaft 162 inside tube 104 such that water pumped through annular space 176 is directed into the wind stream flowing though central passage 118 of tube 104. Outer coaxial shaft 162 may also be connected to a manifold or distribution pipes that extend around or across passage central passage 118 to spray water into the wind stream passing through tube 104.

Figure 6:
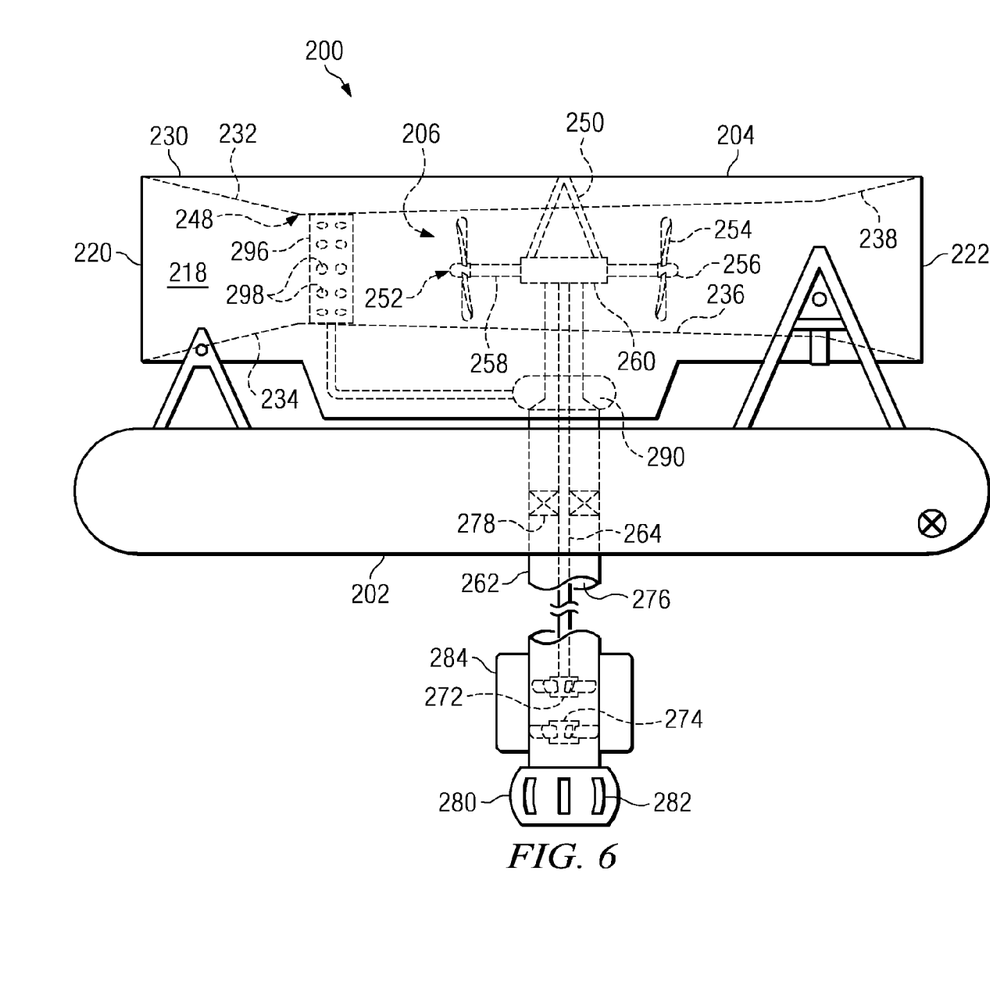
FIG. 6 is a side view of a third embodiment of a wind water pump according to the disclosure.

FIG. 6 is a side view of another alternate embodiment of an ocean wind water engine for de-energizing a storm. Engine 200 includes a pair of pontoons 202, an elongated tube 204 and a wind turbine 206 mounted inside tube 204. Pontoons 202 may have a "V" shape cross-section substantially the same as pontoons 12 described above in connection with FIG. 1. Pontoons 202 may be provided with internal and external bracing and additional structural members to support the weight of cylindrical tube 14 and wind turbine 16. Elongated tube 204 and pontoons 206 may be formed from glass reinforced plastics, carbon composite materials or a suitable metal alloy. Pontoons 202 and tube 204 may be provided with internal and external bracing and additional structural members to support the weight of wind turbine 206.

Elongate tube 204 includes an outer wall 230 and inner wall 232 that defines a central passage 218 having an inlet 220 and outlet 222. Cylindrical tube 204 may have a length of approximately one hundred feet or greater with an outside diameter of approximately sixty feet or more. In one embodiment, central passage 218 is configured as a venturi, including a first, inwardly tapering section 234 and a second outwardly tapering section 236 and a constriction 248 therebetween.

The geometry and construction of elongate tube 204 may be the same as, or similar to the geometry and construction of elongate tube 14 of FIG. 1. In one embodiment, inner wall 232 may be inclined inwardly toward a central longitudinal axis of the tube at an angle of approximately thirty degrees over a length of ten to twenty percent of the overall length of tube 204. The inside diameter of constriction 248 may equal to twenty to fifty percent of the overall length of tube 204. Inner wall 232 is outwardly tapered at an angle of approximately five degrees over a seventy to eighty percent of the overall length of tube 204. In third section 238 inner wall 232 tapers outwardly to outlet 222 of central passage 218.

Wind turbine 216 is mounted in central passage 218 by means of support beams 250. Mounting wind turbine 206 inside tube 204 reduces the overall profile of engine 200 and may increase the survivability of the engine in the case of severe storms. Alternatively, mounting turbine 216 inside tube 204 may be less efficient in pumping and distributing water into the wind stream passing through the tube than mounting the turbine outside the tube as illustrated in FIGS. 1 and 4. In the illustrated embodiment, wind turbine 216 is a horizontal coaxial contra-rotating machine having rotors 252 connected to differential 260 with shafts 258. Each of rotors 252 includes blades 254 attached to a hub 256 mounted on a shaft 258. Rotors 252 may be configured with variable pitch blades so as to vary the angle of attack of the blades in order to control the speed of the rotor. In other variations, wind turbine 216 may be a single rotor horizontal axis machine having the rotor mounted on the upstream or downstream side of differential 260. Alternatively, turbine 216 may be a vertical axis machine such as an "eggbeater" style wind turbine. Blades 254 may be formed from glass reinforced plastics, carbon composite, a suitable metal alloy or a combination thereof. Blades 254 may have a length such that the swept area of rotor 252 is equal to from about fifty to about ninety percent of the cross-sectional area of central passage 218 at the point where the rotor is positioned in the passage.

The rotary force generated by the wind stream impinging on blades 254 of rotors 252 is transmitted to differential 260 by drive shafts 258. Differential 260 in turn drives counter rotating outer and inner shafts 262 and 264 along with one or more first impeller(s) 272 mounted on the outside of inner coaxial shaft 264 and one or more second impeller(s) 274 mounted on the inside surface of outer coaxial shaft 264. Impellers 272 and 274 pump water up through the annular space 276 between the first and second shafts. A plurality of bearings or bushings 278 may be provided between outer shaft 262 and inner shaft 264 at spaced apart intervals to maintain the spacing between the shafts. An intake screen 280 having slots 282 is provided at the end of outer shaft 262 to prevent ingress of marine life and debris into the shaft. A ballast tank 280 may also be provided and mounted near the lower end of outer coaxial shaft 262 to stabilize coaxial shafts 272, 274 when the shafts are deployed.

A take off fitting 290 (similar to take off fitting 90 of FIG. 3) mounted on the exterior of outer shaft 262 directs the water though a pipe to a distributor or manifold 296 positioned at or slightly downstream of constriction 248. Water from manifold 296 flows through a plurality of holes or ports 298 formed though inner wall 232 and into central passage 218, cooling the air stream passing through tube 204. Positioning manifold 296 at or slightly downstream of constriction 248 aids in pumping and distributing the water into central passage 218 because the pressure inside passage 218 at the constriction will be reduced due to the venturi effect of the constriction.

In those embodiments wherein the engine 10, 100 or 200 is equipped with an electrical generator, the engines may be used to generate electricity when not deployed for de-energizing storms. It is anticipated that the engines may be tethered near shore in windy areas and connected to a power gird or to energy storage devices to utilize the power generating capacity.

It will be appreciated by those skilled in the art having the benefit of this disclosure that this ocean wind water pump provides a means of de-energizing storms such as hurricanes. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An engine for reducing the temperature at the surface of a body of water during a storm comprising:
    at least one floatation member for supporting the engine when deployed in the body of water;
    an elongate tube mounted substantially horizontally on the floatation member and configured to receive a stream of air therethrough the elongate tube interior, the elongate tube having first interior and second interior tapered portions and an interior constriction therebetween and a manifold for distributing water into the elongate tube adjacent the constriction;
    a wind turbine having at least one rotor, a differential and a shaft connecting the rotor to the differential;
    a pump operatively connected to the wind turbine, the pump having an input section extending into the body of water to a depth of at least 50 feet whereat the temperature of the water is at least 20° C. below the surface temperature of the water, the pump pumping water from the body of water into the manifold; and
    wherein water having a temperature less than the temperature of the water at the surface of the body of water is pumped into the manifold and distributed into the interior of the elongate tube and into the stream of air whereby the stream of air passing through the elongate tube is cooled.

2. The engine of claim 1, wherein the wind turbine further comprises a dual rotor horizontal coaxial contra-rotating machine.

3. The engine of claim 2, wherein the wind turbine is mounted on top of the elongate tube.

4. The engine of claim 2, wherein the wind turbine is mounted inside the elongate tube.

5. The engine of claim 1, wherein the wind turbine comprises a single rotor horizontal coaxial machine.

6. The engine of claim 5, wherein the wind turbine is mounted on top of the elongate tube.

7. The engine of claim 5, wherein the wind turbine is mounted inside the elongate tube.

8. The engine of claim 5, wherein the rotor of the wind turbine is mounted on an elongate tube inlet or outlet side of the differential.

9. The engine of claim 5, wherein the rotor is mounted on an elongate tube inlet or outlet side of the differential.

10. The engine of claim 1, further comprising first and second coaxial counter-rotating shafts, wherein the second shaft is positioned inside the first shaft and wherein the counter-rotating shafts are driven by the differential and extend into the body of water.

11. The engine of claim 10, wherein the pump comprises first and second counter-rotating impellers and wherein the first impeller is mounted on an inside surface of the first coaxial counter-rotating shaft and wherein the second impeller is mounted on an outside surface of the second counter rotating shaft within the first counter-rotating shaft and wherein the impellers pump water through an annular space between the counter-rotating shaft and into the means for distributing water into the air stream passing through the elongate tube.

12. The engine of claim 10, wherein the first shaft is from about fifty to about five thousand feet in length when deployed in a body of water.

13. The engine of claim 10, further comprising a floodable ballast tank mounted on the second coaxial counter-rotating shaft adjacent the lower end of the shaft.

14. The engine of claim 1, wherein the floatation device comprises a pair of pontoons and wherein the pontoons are adapted to be flooded to stabilize the engine on a body of water.

15. The engine of claim 1, further comprising a generator for generating electrical power, the generator being driven by the wind turbine.

16. The engine of claim 1, further comprising a sea anchor for stabilizing the engine.

17. The engine of claim 1, wherein the manifold for distributing water into the elongate tube interior comprises at least one of a manifold and a plurality of individual pipes opening into the elongate tube interior.

18. The engine of claim 1, wherein the elongate tube is rotatably mounted on the floatation member such that the tube may be rotated relative to the floatation member.

19. The engine of claim 18 wherein the elongate tube is mounted on a hinge adjacent a first end thereof and on a cradle adjacent a second end thereof.

20. An engine for reducing the temperature at the surface of a body of water during a storm comprising:
    at least one floatation member for supporting the engine when deployed in the body of water;
    an elongate tube mounted on the floatation member and configured to receive a stream of air therethrough the elongate tube interior, the elongate tube having first interior and second interior tapered portions and an interior constriction therebetween and a manifold for distributing water into the elongate tube adjacent the constriction;
    a wind turbine having at least one rotor, a differential and a shaft connecting the rotor to the differential;
    a pump operatively connected to the wind turbine, the pump having an input section extending into the body of water to a depth of at least 50 feet whereat the temperature of the water is at least 20° C. below the surface temperature of the water, the pump pumping water from the body of water into the manifold;
    a first and second coaxial counter-rotating shafts of the pump input section, wherein the second shaft is positioned inside the first shaft and wherein the counter-rotating shafts are driven by the differential and extend into the body of water; and
    wherein water having a temperature less than the temperature of the water at the surface of the body of water is pumped into the manifold and distributed into the interior of the elongate tube and into the stream of air whereby the stream of air passing through the elongate tube is cooled.

21. An engine for reducing the temperature at the surface of a body of water during a storm comprising:
    at least one floatation member for supporting the engine when deployed in the body of water;
    an elongate tube mounted on the floatation member and configured to receive a stream of air therethrough the elongate tube interior, the elongate tube having first interior and second interior tapered portions and an interior constriction therebetween and means for distributing water into the elongate tube adjacent the constriction;
    a wind turbine having at least one rotor, a differential and a shaft connecting the rotor to the differential;

a pump operatively connected to the wind turbine, the pump having an input section extending into the body of water to a depth of at least 50 feet whereat the temperature of the water is at least 20° C. below the surface temperature of the water, the pump pumping water from body of water into the means for distributing water into the elongate tube interior;

wherein water having a temperature less than the temperature of the water at the surface of the body of water is pumped into the manifold and distributed into the interior of the elongate tube and into the stream of air whereby the stream of air passing through the elongate tube is cooled; and wherein the elongate tube is rotatably mounted on the floatation member such that the elongate tube may be rotated relative to the floatation member.

* * * * *